May 3, 1960     H. L. DUNLAP     2,935,033
FREIGHT SUPPORTING BAR
Filed Jan. 7, 1955     3 Sheets-Sheet 1
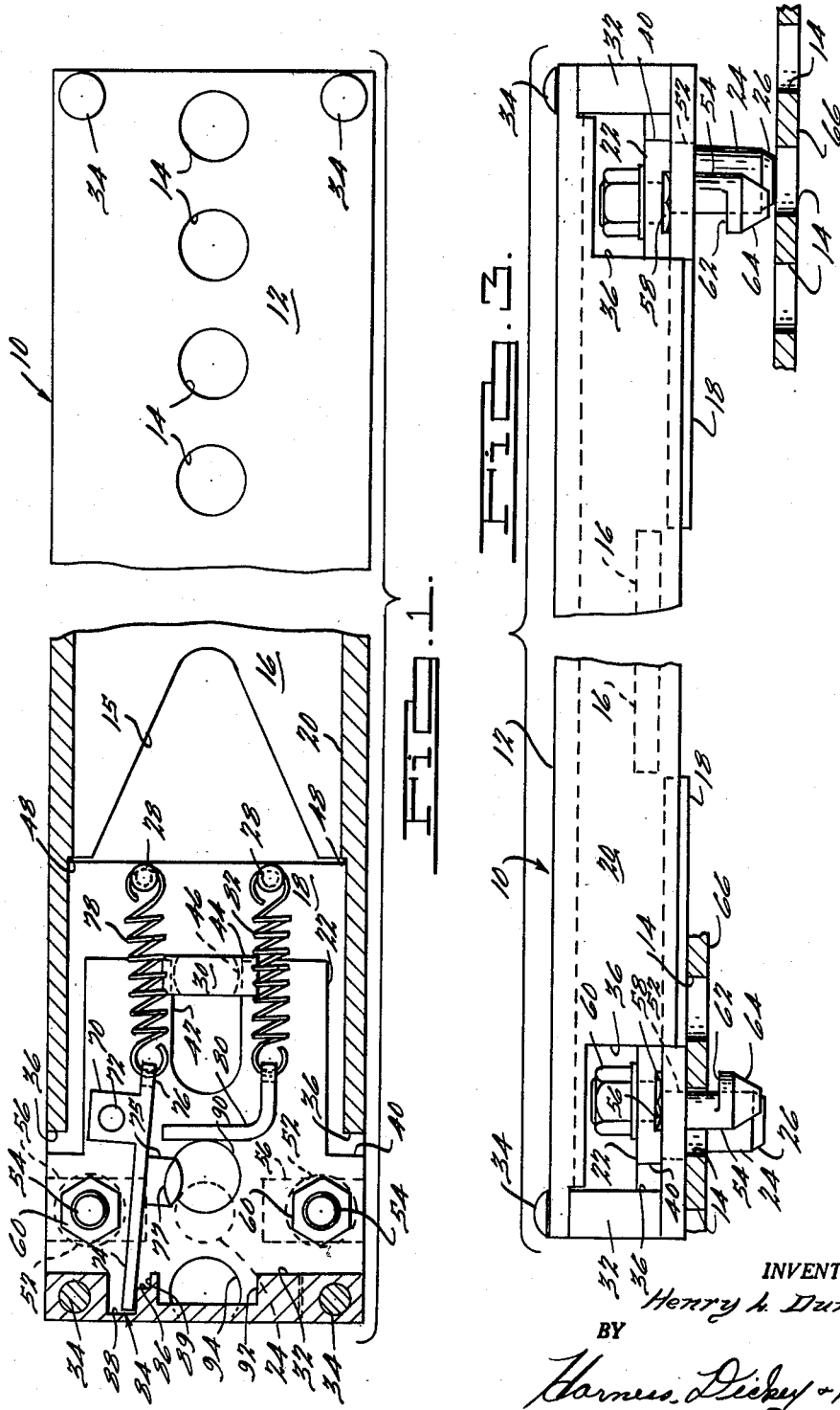
INVENTOR.
Henry L. Dunlap
BY
Harness, Dickey & Pierce
ATTORNEYS.

May 3, 1960 H. L. DUNLAP 2,935,033
FREIGHT SUPPORTING BAR
Filed Jan. 7, 1955 3 Sheets-Sheet 2
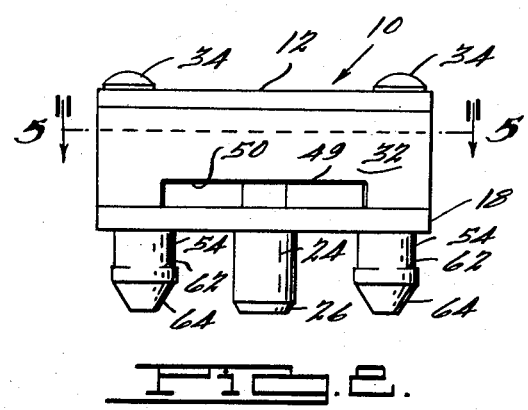
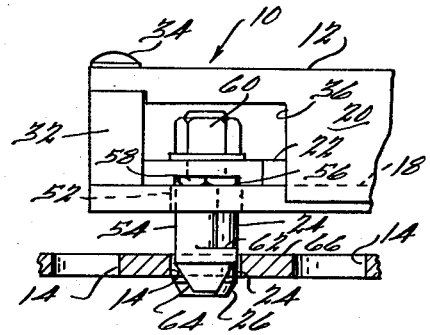
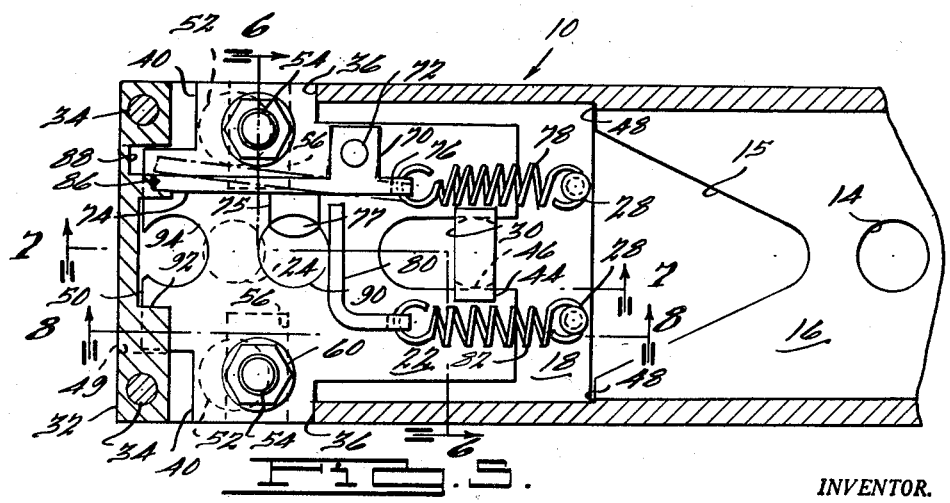
INVENTOR.
Henry L. Dunlap
BY
Harness, Dickey & Pierce
ATTORNEYS May 3, 1960 H. L. DUNLAP 2,935,033
FREIGHT SUPPORTING BAR Filed Jan. 7, 1955 3 Sheets-Sheet 3

INVENTOR.
Henry L. Dunlap
BY
Harness, Dickey & Pierce
ATTORNEYS

United States Patent Office 2,935,033
Patented May 3, 1960

2,935,033

FREIGHT SUPPORTING BAR

Henry L. Dunlap, Dearborn, Mich., assignor to Evans Products Company (Delaware)

Application January 7, 1955, Serial No. 480,361

15 Claims. (Cl. 105—369)

The present invention is related generally to freight loading and storing apparatus for use in freight storage areas and especially in freight and cargo hauling vehicles such as ships, railroad cars, highway trucks, and the like. More particularly, the invention relates to a portable deck member which can be placed anywhere with respect to cooperating members of the apparatus, and which has a safety lock which maintains the member locked in position.

In a co-pending application of Harvey W. Chapman and Henry L. Dunlap, Serial No. 457,474, filed September 21, 1954 now United States Patent No. 2,834,304, a system of freight-loading apparatus is disclosed which employs opposed, aligned patterns of fixed structural members on two surfaces enclosing a freight-supporting surface, usually one pattern on the freight-supporting surface itself and another aligned therewith on the overhead above the freight-supporting surface. In this system each of the fixed structural members have on their exposed surfaces a pattern of holes and/or parallel lines of holes in which re-usable freight bracing members, portable deck members and other re-usable dunnage members may be anchored by means of pins inserted in the holes.

The principal object of this invention is to provide an adjustable freight bracing member for use with the freight loading system of the above-mentioned co-pending application and with other similar loading systems.

Another object of this invention is to provide a freight bracing member in the form of a portable deck member which can be attached anywhere on the deck members and which has a latching means which incorporates a safety lock which maintains the latching means in the latched position without dependence on springs or other fragile means.

Another object of this invention is to provide a freight bracing member of the character described which is easily attachable to cooperating members, and which also has been provided with a means of accommodating other similar members.

Still another object of this invention is to provide a freight bracing member of the character described which cannot become unlatched and displaced by the action of any force against its external surface, and which also is so designed that any projecting parts of cooperating bracing members which enter its body will not cause it to become unlatched.

Yet another object is to provide a freight bracing member of the character described which has a trigger-operated latching mechanism.

Other objects and advantages will be apparent, or will become apparent, in the more detailed description of the invention to follow, especially when taken in conjunction with the accompanying drawings in which:

Figure 1 is plan view, with portions broken away and in section, of a freight bracing member of this invention showing a sliding type latch end fitting in the unlocked position ready for insertion of its pins into, or removal from, the holes in a cooperating member;

Fig. 2 is an end view of the latch end fitting of Fig. 1;

Fig. 3 is a side view of the freight bracing member of Figs. 1 and 2 showing the pins of the sliding latch fitting on one end locked into the holes of the cooperating member and the pins of a similar fitting on the other end of the member about to be inserted into the holes of the same or different cooperating member;

Fig. 4 is a fragmentary side view of a sliding latch fitting similar to those of the preceding figures with the fitting in the unlocked position and its pins partially entered into the cooperating structure;

Fig 5 is a fragmentary plan view in section of the freight bracing member of the preceding figures showing the parts of the sliding latch fitting in the locked position, the section being viewed as if along the line 5—5 of Fig. 2;

Figure 6:
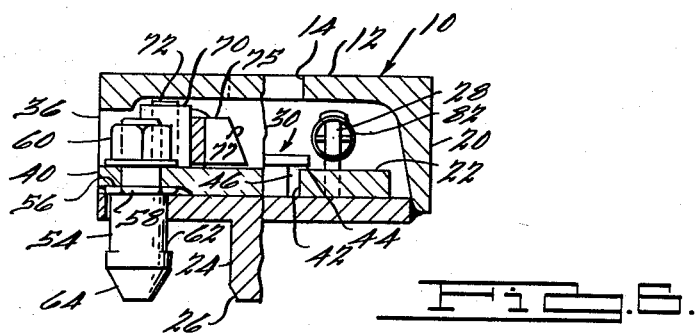
Fig. 6 is an end view in section of the freight bracing members of Figs. 2 and 5, the section being taken along the line 6—6 of Fig. 5.
Figure 7:
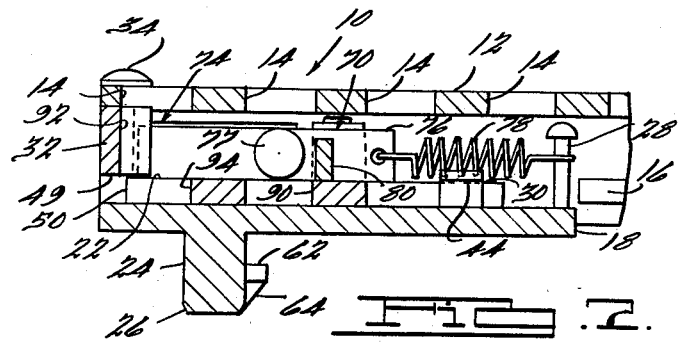
Fig. 7 is a fragmentary side view in section of the freight bracing member, the section being taken along the line 7—7 of Fig. 5.

In accordance with the present invention, a freight bracing member is provided having a latch fitting on each end, at least one of which is of a novel type which may be called a sliding, safety-locking latch. The latter type of fitting is employed to operate a shouldered lock pin or pins, or other locking device, and comprises a sliding plate-like element housed in the end of the member and to which are rigidly attached the lock pins, or locking device, and a pivotable safety lock lever. The entire slide plate assembly is rigidly held in locking position by the safety-lock lever engaging a notched out recess or shoulder in the end of the member. While a spring or springs are used to bias the slide plate and the latch pins to the locked position, this spring does not take any of the load on the pins because the load is taken by the safety-lock lever in the rigidly locked position. A trigger associated with the safety-lock lever is provided to move the latter out of the safety-locked position to permit the entire slide plate assembly to be moved out of the latched position. This trigger is located in the interior of the member where it can be reached only by a finger or tool inserted therein for that purpose. In order that the trigger hole be not rendered inoperative for the purpose of inserting the pins of other cooperating members, a hole in the slide plate beneath the trigger and a stop bracket on the slide plate are provided so that such other pins serve to prevent movement of the slide plate even though the trigger and safety-lock lever be operated by the travel of the pin thereinto.

Referring now to the accompanying drawings, it will be seen that the freight bracing member comprises a body member 10 of channel shape having in its exposed web 12 a series of spaced-apart holes 14. The latter holes preferably are at a spacing corresponding to that of the freight-loading system to enable the erection thereon, or the securing thereto, of other freight bracing members. Between the sides of the channel there is provided one or more transverse bracing members or plates 16 which are provided with a cutaway 15 beneath the holes 14 of the web 12 and also with holes 14 (Fig. 5). With such provision, pins of other cooperating bracing members may be inserted through the holes 14 in web 12 and the bracing members 16 in order to relieve the instant bracing member of shearing forces and to prevent over-turning, canting or cocking of the member.

Each end of the member 10 is provided with a bottom plate 18 which is attached to the channel sides 20. The plates 18 provide a flat bearing surface for the member to rest on and, also, a lower bearing surface for a sliding latch plate 22. Securely anchored in the center of each bottom plate 18 is a fixed, straight-sided pin 24 having a tapered nose portion 26. Secured to the upper surface of each bottom plate 18 are a pair of spring anchor pins 28 and an upstanding buttress or T-guide member 30. Across the open end of the channel there is provided an end plate 32 which is held in place by bolts 34. Near each end, the channel sides 20 are cut away to leave an opening 36 in which there is slideably disposed a projecting corner or shoulder 40 of the sliding latch-plate 22.

Figure 8:
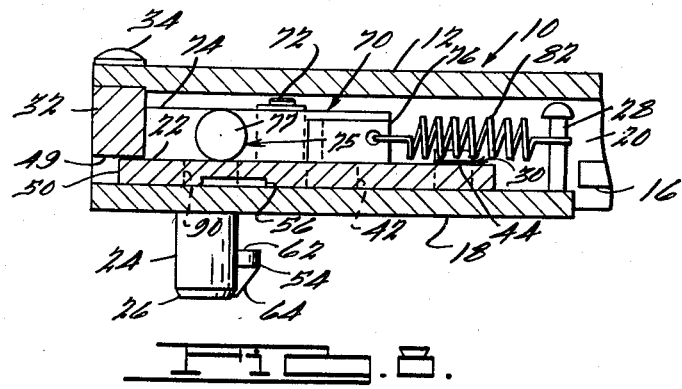
Fig. 8 is a fragmentary side view in section of the freight bracing member, the section being taken along the line 8—8 of Fig. 5.

The sliding latch plate 22 has a slot-like cutaway 42 which fits under the head 44 and bears against the rounded guide surfaces 46 of T-guide 30. The channel sides 20 also have been machined away to accommodate the bottom plate 18. The end plate 32 is also cut away or slotted at 49 (Figs. 2 and 8) to permit passage therethrough of a forwardly projecting end or tongue 50 (Figs. 2 and 5) of slide plate 22. It will also be seen that the shoulders 40 are smaller than the openings 36 to permit a small amount of fore-to-back sliding movement in the slide plate 22, the outer edges of openings 36 serving as stops, limiting forward and backward movement of the plate.

The bottom plates 18 both have a pair of holes 52 (Fig. 4) through which there project a pair of latch-pins 54, the pins 54 being secured in the sliding latch plate 22. The sliding latch plates 22 are each provided in their bottom surfaces with a rectangular cutaway recess 56 in which is fitted a hexagonal shoulder 58 of the latch-pins 54. The upper ends of the pins 54 project through the slide plate 22 and are provided with nuts 60 to hold the pins. The recesses 56 hold the hexagonal shoulders 58 of the pins so as to maintain the correct radial location for correct locking. The lower end of each latch-pin is provided with a shoulder 62 and a conical nose portion 64. The shoulders 62 lock behind and around the edge of holes 14 of cooperating structure 66 to hold the member 10 in place thereon. The pins 54 are moved into and out of locking position by appropriate sliding movement of slide plate 22. The latter movements are controlled by a latching mechanism secured to the upper surface of the plate and which is described below.

Secured to the upper surface of slide plate 22 is a pivotable safety-lock lever 70 which is pivoted on a pin 72 secured in the plate. The lever 70 comprises an elongated finger portion 74 projecting forwardly and a shorter spring anchor arm 76 which projects backwardly, and a lug-like trigger 75 projecting sidewardly and having an upwardly tapered cam surface 77 (see Fig. 6) facing the web 12 of the member. An extension spring 78 is secured in a hole in arm 76 and has its other end secured over anchor pin 28 in bottom plate 18. To secure smooth sliding of the plate 22, a second spring anchor arm or stop arm 80 is secured to the upper surface of plate 22 and a second extension spring 82 is secured thereover and anchored on its other end over the second of pins 28. The second spring is not absolutely essential but its use will prevent some cocking and binding of plate 22.

As will be seen in Figs. 1 and 5, end plate 32 has a shouldered, vertically-extending recess 84 adjacent the end 74 of lever 70, the shallow shoulder 86 being the safety-lock position preventing outward movement of plate 22 and the deeper portion 88 permitting plate 22 to move forward to disengage pin shoulder 62 from the edge of the hole 14 in cooperating structure 66. The inner edge surface 89 of the shouldered recess 86 functions as a side stop to keep the end 74 of lever 70 from moving to a jammed, in-line position against the end plate 32. The normal action of the springs 78, 82 is to urge the slide plate 22 and its pins 54 inwardly of the member 10 and to pivot lever 70 to a position where its end 74 can seat itself in the lock shoulder 86. When the lever 70 is pressed outwardly and to the side, the end 74 is moved out of contact with the shoulder 86 and surface 89 and the slide plate 22 can move outwardly in the member.

The slide plate 22 is provided with a hole 90 immediately adjacent the trigger 75. When the pin of a cooperating member is inserted through the hole 14 in web 12 above trigger 75, the latter will be biased to the side to move end 74 of lever 70 out of the safety lock recess 86. The inserted pin will pass through web 12, slide plate 22 and bottom plate 18. By permitting such pin to pass into slide plate 22, the latter plate can not move to unlock the shoulders 62 of pins 54 from the cooperating member 66. Furthermore, the stop arm 80 contacts the other side of the inserted pin to assist in preventing movement of plate 22. Likewise, since another pin of the cooperating member could be inserted in the hole 14 near the end of member 10, the inner surface of end plate 32 is cut away, as indicated at 92, to provide clearance and the plate 22 likewise has a hole 94 to permit such pin to extend through a hole 14 in bottom plate 18, if the inserted pin is sufficiently long to do this.

*Operation*

In Fig. 1 the slide plate 22 is shown in the unlocked or unlatched, forward position with safety-lock lever 70 seated in the deep recess 88. In Fig. 3, the latch-pins 54 and center pin 24 on the left hand end are shown in the locked position whereas those of the right hand end are shown in position to enter holes 14 of member 66. In Fig. 4 the pins 24, 54 are shown in the "act-of-entering" position. In Fig. 5, however, the slide plate 22 is shown in the locked position and safety-lock lever 70 is shown with its end 74 firmly seated in recess 86. Any force exerted on pins 54 while in the position shown in Fig. 5 which tends to move plate 22 to the unlocked position would be taken up by the lever 70 and not by springs 78, 82.

To attach member 10 to cooperating member 66, the following procedure would be employed: A rod-like tool (or the operator's finger) is inserted through the hole 14 in web 12 located directly above trigger 75. The tool will first engage the sloping surface 77 of trigger 75 and force the latter aside and outwardly of the member against the action of spring 78, thereby pivoting safety-lock lever 70 to the position shown in phantom in Fig. 5. At this point the pins 54 would be in the position shown at the right hand end of Fig. 3, or in other words the "ready" position. The pins 24, 54 are then located over the holes 14 of cooperating member 66 (as shown in Fig. 3), and the member is then pressed downwardly to cause the pins to enter the holes. The conical end 26 of pin 24 and the conical noses 64 of pins 54 "lead" the pins into alignment. As the pins come into alignment with the holes, the slide plate 22 will be advanced to assume the position shown in Fig. 4. During the advance of plate 22 the end 74 of safety-lock lever 70 advances into the deep recess 88. The pins can then be forced into the holes by pushing down on the web or stamping thereon. When the pins 24, 54 have completely entered the holes 14 of member 66, the shoulders 62 of pins 54 will permit the springs 78, 82 to retract the slide plate to the position shown at the left in Fig. 3. When this occurs, shoulders 62 of pins 54 engage under the edge of holes 14 and lock themselves thereto. When the rod-like tool or finger is withdrawn, spring 78 will cause the end 74 of safety-lock lever 70 to pivot or move into contact with shallow shoulder 86, further pivotal movement of lever 70 being limited by surface 89 of end plate 32. The plate 22 then can no longer move outwardly to the unlatched position. The inwardly movement of plate 22 is halted or limited by the edge of the opening 36 coming into contact with shoulders 40 of plate 22. Assuming that the same procedure has been followed at both ends of member 10, the member is now securely locked to cooperating member 66 in the bracing position. In such a position it might be desired to erect on web 12, or secure thereto, still another cooperating member having pins for insertion in holes 14. It may be necessary to utilize for this purpose the hole directly above trigger 75. When a pin is inserted in such trigger hole, the trigger 75 is biased to the unlocked position wherein end 74 of lever 70 is moved out of contact with recess 86. As stated above, the entry of the pin into hole 90 in plate 22 and the contact of such pin with spring anchor arm or stop guide 80 will positively lock and hold slide plate 22 in its locking position.

To remove the member 10 from cooperating member 66, the same rod-like operating tool, or operator's finger, is again inserted through hole 14 above trigger 75. As the tool or finger proceeds into the hole it comes into contact with a sloping cam surface 77 of trigger 75 and biases the latter and lever 70 to the unlocked position. The rod or finger continues into the hole until it enters hole 90 in plate 22. Sidewise pressure is then exerted on hole 90, using the edge of hole 14 in web 12 as a fulcrum, to advance slide plate 22 together with its pins 54 into the unlocked position shown in Figs. 1 and 4, against the urging of springs 78, 82. Member 10 can then be lifted off cooperating member 66 to withdraw pins 24, 54 from the holes 14 therein. After the pins clear the holes of member 66 the tool or finger can be removed to allow plate 22 to be retracted by the springs to the position shown on the right in Fig. 3 and at the left in Fig. 5. Release of trigger 75 allows safety-lock lever 70 to resume its locked position as shown in Fig. 5. In this position the safety-lock lever 70 rigidly holds the pins 54 and plate 22 to prevent undue exercise of springs 78, 82 by chance collision with other objects during storage, etc.

The member 10 of this invention can be used as a portable deck or overhead member to permit the erection anywhere on the deck and overhead patterns of fixed structural members of vertical freight bracing members, or it may be extended between such vertical bracing members as a rigidifying brace. The member also may be secured to the deck or overhead as a cleat or anchor strip around the base of a bulkhead, frame or other bin-like structure. The member can be raised on tools and inserted in the overhead far above the operator's reach, removal of the tools being all that is required to lock it in place. Many other uses for the member will readily occur to one familiar with such freight loading apparatus.

What is claimed is:

1. An elongated freight bracing member having on each end thereof a sliding latch plate journalled therein for longitudinal sliding movement between locked and unlocked positions, at least one shouldered latch pin mounted on said latch plate and projecting transversely through said member to engage cooperating structure, a pivoted safety-lock lever pivotally mounted on said latch plate, a shouldered recess in the body of said member positioned to receive one end of said safety-lock lever, a first portion of said recess being of a depth to prevent sliding movement of said plate when engaged by said lever and a second portion being sufficiently deep to permit full travel of said plate between said two positions, and a spring connecting said lever with the body of said member for normally urging said plate into locking position and said lever into said first recess portion.

2. A member as defined in claim 1 and further characterized in that said member has a hole above said safety-lock lever, said lever has a tapered, tool-contacting cam-surface thereon positioned beneath said hole and disposed for co-operation with a tool for pivotally moving said lever in a direction to move said one end thereof from said first portion of said recess to said second portion thereof, and said slide plate has a hole therein beneath said cam surface whereby said safety-lock lever can be moved into said second recess portion by an object inserted through said body hole, and said hole in said slide plate can receive said object for levering movements to move said plate out of locking position.

3. An elongated member of the character described comprising an elongated body member of generally channel shape, a bottom plate near at least one end of said body, a latch plate slidably journalled in the end of said body on said bottom plate for longitudinal sliding movements therein between a locked position and an unlocked position, an end plate closing the end of said body, a fixed pin projecting downwardly from said bottom plate to engage a cooperating structure, at least one latch pin secured in said sliding latch plate and projecting downwardly through said bottom plate, said latch pin having a shoulder in its outer end to engage the edge of a hole in the said cooperating structure, a pivotable safety-lock lever secured to said latch plate and extending in a direction generally longitudinally of said body so as to contact said end plate, said end plate having a shouldered recess to receive the end of said lever, a first portion of said recess in said end plate being sufficiently shallow to prevent sliding movement of said latch plate when contacted by said lever and a second portion of said end plate recess being sufficiently deep to permit full travel of said lever between the two said positions of said plate, and an extension spring anchored in said body on one end and, on the other end, to said safety-lock lever so as to normally bias said lever to said first recess portion and to urge said latch plate to the locked position.

4. A member as defined in claim 3 and further characterized in that the web portion of said body, said latch plate, and said bottom plate have holes which are aligned, in the locked position of said latch plate.

5. A member as defined in claim 3 and further characterized in that said body has a hole in its web portion positioned above said safety-lock lever and the latter has a cam surface positioned beneath said web hole and tapered in such a manner that a rod-like object inserted through said hole will move said safety-lock lever out of said first recess portion.

6. A member as defined in claim 3 and further characterized in that the web portion of said body and the said latch plate have holes which are aligned, at the locked position of said plate, and the said safety-lock lever has a trigger portion normally protruding into the path defined by said holes, said trigger portion having a tapered cam surface slanting in such a way that an object inserted through said holes will bias said safety-lock lever out of said first recess position.

7. A latching mechanism adapted to be housed in the interior of a freight supporting member comprising a body member, a latch plate slideably mounted on said body member for reciprocating movement relative thereto between locked and unlocked positions, spring means acting between and connected to the body member and plate to urge the plate to a locked position, a locking means secured to said latch plate, a safety-lock lever pivotally mounted on said latch plate and slidable with it and spring means connected to said lever and said body member for normally biasing said plate to said locked position, said lever engaging a portion of said body member in said locked position to prevent the movement of said plate to said unlocked position.

8. A latching mechanism as defined in claim 7 wherein a trigger is provided on said lever in a position for easy access through a wall of said body member, said trigger having a cam surface adapted to move said lever out of engagement with said portion of the body member when contacted by an object entering said body member.

9. In a freight supporting member, an elongated body, a slide mounted in the body adjacent one end thereof for limited longitudinal movement relative thereto and having a rigid lock pin projecting transversely to the length of the body, spring means connected to said body and said slide for normally urging the slide to a position wherein said lock pin is operative, cam means on said body and said slide for moving the slide against the resistance of said spring means to disconnect said lock pin, latch means movably mounted on said slide and connected to said spring means so as to be operated thereby to hold said slide in a locked position, and second cam means on said latch means to disconnect said latch means.

10. The invention set forth in claim 9 wherein said two cam means are located in transverse alignment whereby both may be operated simultaneously by an instrument extending transversely to the body.

11. The invention set forth in claim 9 wherein said latch means comprises a lever connected to said slide and engaging said body to act in compression between said slide and said body to take unlocking loads applied to said lock pin.

12. In a freight supporting member adapted to be attached to a support, a body portion, a latch portion movable to and from an operative position in which said supporting member is latched to said support, means movably mounting the latch portion on the body portion for movement to and from a locking position, a safety link movably mounted on said latch portion, and means on the body portion engageable with the link when said latch portion is in said operative position and said link is in said locking position for transmitting unlatching loads on said latch portion through said link to said body portion.

13. In a bracing member, an elongated body, means at one end of the body for securing it to a surface, said means including a slide plate slidably mounted within said body for slidable movement longitudinally thereof and having a pin projecting transversely therefrom, said body having sides located on opposite sides of said plate, said pin projecting through a slot in one of said sides, at least one of said sides and said plate having alignable openings therein spaced from said pin, said holes being in alignment when said slide is in a position to lock said body to a support surface.

14. The invention set forth in claim 12 including spring means connected to said link and said body for normally urging said link and latch portion to a locking position.

15. In a bracing member, an elongated channel having a web and side legs, a plate secured to said legs and parallel to said web to define a chamber bounded by said web, legs, and plate, a transverse member secured across the end of said chamber, said transverse member having an opening therein, and a lock slide disposed in said chamber for longitudinal movement relative thereto and having a tongue projecting through said opening and guided by it, openings formed in said legs, transversely extending portions on said slide disposed in said openings and of less length than said openings whereby said slide is movable in said openings and the range of movement is controlled by the width of said openings.

References Cited in the file of this patent
UNITED STATES PATENTS

| | | |
|---|---|---|
| 1,665,439 | Brown | Apr. 10, 1928 |
| 1,868,638 | Mackey | July 26, 1932 |
| 2,124,082 | Reifer | July 19, 1938 |
| 2,354,861 | Hermann | Aug. 1, 1944 |
| 2,575,550 | Fahland | Nov. 20, 1951 |
| 2,575,751 | Donnelley | Nov. 20, 1951 |
| 2,593,174 | O'Dell | Apr. 15, 1952 |
| 2,627,821 | Sjogren | Feb. 10, 1953 |
| 2,652,004 | Stough | Sept. 15, 1953 |
| 2,659,319 | Herman | Nov. 17, 1953 |
| 2,725,826 | Tobin et al. | Dec. 6, 1955 |
| 2,747,520 | Brown | May 29, 1956 |
| 2,769,404 | Dietuchson | Nov. 6, 1956 |
| 2,834,304 | Chapman et al. | May 13, 1958 |